(12) United States Patent
Eriksson et al.

(10) Patent No.: US 7,957,376 B2
(45) Date of Patent: Jun. 7, 2011

(54) EFFICIENT MBMS BACKBONE DISTRIBUTION USING ONE TUNNEL APPROACH

(75) Inventors: Kent Eriksson, Ranas (SE); Lasse Olsson, Stenungsund (SE); Hans Ronneke, Kungsbacka (SE); Gunnar Rydnell, V Frolunda (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 179 days.

(21) Appl. No.: 12/445,106

(22) PCT Filed: Oct. 12, 2006

(86) PCT No.: PCT/SE2006/001159
§ 371 (c)(1),
(2), (4) Date: Apr. 10, 2009

(87) PCT Pub. No.: WO2008/044971
PCT Pub. Date: Apr. 17, 2008

(65) Prior Publication Data
US 2010/0027541 A1    Feb. 4, 2010

(51) Int. Cl.
*H04L 12/28* (2006.01)
(52) U.S. Cl. .................. 370/390; 370/352; 370/401
(58) Field of Classification Search .............. None
See application file for complete search history.

(56) References Cited

U.S. PATENT DOCUMENTS

| | | | | |
|---|---|---|---|---|
| 7,162,241 | B2 * | 1/2007 | Kim et al. | 455/435.2 |
| 2004/0017809 | A1 * | 1/2004 | Park | 370/390 |
| 2005/0111395 | A1 * | 5/2005 | Hwang et al. | 370/313 |
| 2007/0178916 | A1 * | 8/2007 | Sorbara et al. | 455/458 |
| 2007/0197235 | A1 * | 8/2007 | Zhang | 455/466 |

OTHER PUBLICATIONS

Ericsson: MBMS One Tunnel optimization; 3GPP TSG SA WG2 Architecture; S2-062951; Aug. 28-Sep. 1, 2006; Sophia Antipolis, France.

* cited by examiner

*Primary Examiner* — Duc C Ho

(57) ABSTRACT

The present invention relates to a method, signal and devices for facilitating distribution of multimedia broadcast multicast services, i.e. MBMS, in a telecommunications network by receiving an MBSM session start message from a broadcast/multicast service center; sending control traffic on a control network; sending as control traffic to a serving node an MBMS session start request message and including a common tunnel end-point identifier, i.e. common TEID, in the MBMS session start request message; receiving information from the serving node indicating the acceptance of using IP multicast; and sending media content on an IP multicast backbone to hosts that have joined the multicast group using the common TEID. If any part of the communication network does not accept the IP multicast backbone as distribution method tunnels will be used between the gateway and serving node and between the serving node and control node.

11 Claims, 10 Drawing Sheets

EFFICIENT MBMS BACKBONE DISTRIBUTION USING ONE TUNNEL APPROACH

TECHNICAL FIELD

The present invention relates to the area of Multimedia Broadcast/Multicast Service (MBMS) and in particular to an enhanced function for delivery of MBMS payload in a GPRS core network.

BACKGROUND OF THE INVENTION

Multicasting is a service that permits sources to send a single copy of the same data to an address that causes the data to be delivered to multiple recipients. Under multicasting only one copy of a message will pass over any link in a network and copies of the message will be made only where paths diverge. From the network perspective, multicast dramatically reduces overall bandwidth consumption, since the data is replicated in the network at appropriate points rather than in the end-systems.

In case the multicast is used in Internet Protocol IP network then it is called IP multicast. With Internet Protocol IP multicast receivers do not need to know who or where the senders are to receive traffic from them and the senders never need to know who the receivers are. Neither senders nor receivers need to care about the network topology as the network optimises delivery. Alternative approach also exist where the receiver knows the sender, described in RFC 4607 "Source-Specific Multicast for IP". The distribution of the information via the IP multicast is performed on the base of hierarchical connection of the hosts, like for example a tree. Several algorithms have been proposed for building multicast distribution trees, like for example spanning trees, shared-trees, source-based trees, and core-based trees. The descriptions of the corresponding algorithms can be found in "IP telephony: Packet-based multimedia communications systems" O. Hersent, D. Gurle, D. Petit, Addison-Wesley, Harlow, 2000. After the establishment of the distribution tree, the IP multicast routing protocols does the distribution of the information. The detailed description of the corresponding IP multicast routing protocols can also be found in the above mentioned document.

Multicast is a receiver-based concept, it means the receivers join a particular multicast session group by informing a corresponding multicast router and traffic is delivered to all members of that group by the network infrastructure. Therefore within the IP multicast the membership of a multicast session group is dynamic it means that the hosts may join and leave groups at any time. In order to allow hosts on networks to indicate whether they wish to join or leave a particular multicast group there is a protocol called the Internet Group Message Protocol IGMP. This protocol lets the system know which hosts currently belong to which multicast group. This information is required by the multicast routers which need to know which multicast datagrams are to be forwarded onto which interface.

The IGMP is a part of the IP layer and the IGMP messages are transmitted in IP data packets. The version 1 of IGMP is described in RFC 1112 "Host extensions for IP multicasting" S. E. Deering, Aug. 1, 1989, RFC 2236 "Internet Group Management Protocol, Version 2" W. Fenner, November 1997 describes the version 2. The IGMP has been developed for IP version 4. In Internet Protocol IP version 6 there is a similar protocol called Multicast Listener Discovery MLD, which is used for the same purpose as the IGMP. The description of the first version of MLD can be found in RFC 2710 "Multicast Listener Discovery (MLD) for IPv6" S. Deering, W. Fenner, B. Haberman, October 1999. However the messages used in MLD correspond to the IGMP messages. In the following the IGMP will be used as an example. Although this should not be restricted to the IGMP, the functionality of the invention is also given by usage of MLD.

In principle the IGMP uses two basic messages to fulfil its tasks, the membership report and the membership query message, and the following rules are applied. The different versions of IGMP contain additional messages.

A multicast router sends a membership query at regular intervals to see if any host still belongs to any group. The router must send one query out on each interface. The group address in the query is 0 since the router expects one response from a host for every group that contains one or more members on each host. It is also possible to send a membership query for one particular group rather than for all groups. A host responds to an IGMP query by sending one IGMP report for each group that still contains at least one user. A host joins a group also by sending the membership report.

Using the information received by applying the report and the query messages, a table with its interfaces having at least one host in a multicast group is established. After the receiving of the multicast data, the router forwards the data out on each interface, which has at least one member.

Multicasting in Public Land Mobile Networks PLMNs like General Packet Radio System GPRS or Universal Mobile Communication System UMTS requires some further development, for example regarding the mobility of the users and the characteristics of the air interface. Further the communication in a mobile communication networks like for example in UMTS is a unicast communication. The unicast communication is also called point-to-point communication. The point-to-point communication means sending a message from a single sender to a single receiver. In such kind of network, in particular in the core network it is not foreseen to perform a multicast communication. The group communication is implemented by means of a point-to-point communication having a sender transmitting separately packets to each member of the group. For a group with n members, n packets are required on the whole way between the sender and the receivers, instead of one packet when multicasting is used.

In the following an overview of the architecture of the General Packet Radio System GPRS network is given.

The GPRS is the packet-switched enhancement of the Global System for Mobile Communication GSM, which is a circuit switched network. GPRS has also been extended to cover the Universal Mobile Telecommunication System UMTS. With the GPRS packet-switched enhancement it means that the user can be permanently online connected but has to pay only for the real data transfer. In order to fulfil the new requirements some changes are introduced into the GSM, among other new logical nodes, the Serving GPRS Support Node (SGSN) and the Gateway GPRS Support Node (GGSN) are introduced. The main functions of the GGSN involve interaction with external IP packet networks providing for example connections to Internet Service Providers ISPs. From the external IP network's point of view, the GGSN acts as a router for the IP addresses of all subscribers served by the GPRS networks. The GGSN also exchanges routing information with the external network. Each GGSN serves a number of SGSNs, which can be arranged as a tree with the GGSN as a root of the tree. The SGSN serves all GPRS subscribers that are physically located within the geographical SGSN service area. It forwards incoming and outgoing IP packets addressed to or from a mobile station.

In order to distinguish between the functionality of these nodes in GSM and UMTS extended names are often used, 2G-SGSN, 3G-SGSN and 2G-GGSN, 3G-GGSN. In the following description it will not be distinguished between the GPRS and the UMTS nodes.

A detailed description of the architecture is to be found 3GPP TS 23.060 v7.2.0 (2006-09) 3 . . . rd Generation Partnership Project; Technical Specification Group Services and System Aspects, General Packet Radio Service (GPRS), Service Description, Stage 2 (Release).

With the introduction of the streaming and of the conversational multimedia services, many new point-to-multipoint services will evolve. Some examples of such services are Mobile TV, video-conferencing, whiteboarding, real-time multi-user games, multimedia messaging, virtual worlds. In particular the network operator will provide a big number of different multicast applications within the mobile network.

The MBMS service is designed for efficient delivery of multicast and broadcast services to groups of users in the GPRS packet-switched network. Through multicast and broadcast on the radio interface in a cell, multiple users can receive in an efficient way simultaneously the payload of e.g. a TV streaming service on the same radio channel which saves radio resources. The service is offered from a core-network control node, the BM-SC. The service is set up through control signalling in the network. For MBMS broadcast service a geographical distribution tree is built up based on "blind" broadcast to a number of cells that belong to the Service area, while the MBMS multicast service is dynamically built up by user joining the service and the distribution tree will consist of the nodes and cells populated by joining users. See FIG. 1. The distribution protocol in the core network is the GTP protocol; signalling and payload are handled by GTP-C and GTP-U respectively.

FIG. 1 describes the situation according to the known solutions. The communication network 1 comprise a BM-SC 2 that is used for broadcasting a multimedia service (the BM-SC in turn will get media content from a content server (not shown)), at least one GGSN 3, 7 that is used for distributing the data further down the communication chain, at least one SGSN 4, and at least one RNC 5. Mobile units (not shown) communicate with the RNC via a Node B (not shown). A GTP tunnel 6 is set up point-to-point from GGSN to each involved SGSN and from SGSN to each involved RNC.

The MBMS distribution tree using GTP point-to-point tunnels between GGSN and the SGSNs is not efficient. There is a problem with the distribution method in that the GGSN will have to duplicate the payload to many SGSNs (RNCs for OTS). Each MBMS payload packet incoming to the GGSN may have to be duplicated and distributed down to 10-20 or any large number of downstream SGSNs. This duplication of packets in the GGSN will be very resource demanding and can slow down the GGSN considerably. Many of these duplicated packets will also be sent on the same egress interface and connection, which is a very inefficient usage of network resources. A more efficient handling of packets in the GGSN is needed. Similarly each MBMS payload packet incoming to the SGSN may have to be duplicated and distributed down to 10-20 or any large number of downstream RNCs. This duplication of packets in the SGSN will be very resource demanding and can slow down the SGSN considerably. Many of these duplicated packets will also be sent on the same egress interface and connection, which is a very inefficient usage of network resources. A more efficient handling of packets in the SGSN is needed.

A first solution to use IP multicast for distribution of MBMS payload in the GPRS core network has been proposed in US Patent Applications 20050007969, 20040246984, 20060034278 (hereby included by reference). A problem with this solution is that it has large impacts on the existing GGSN, SGSN and RNC nodes as the GTP-U implementation is not reused. Another problem is that the proposed methods are not applicable on the MBMS Broadcast service. The proposed methods does also present difficulties to introduce in existing networks as no fallback mechanism from IP multicast distribution to legacy point-to-point distribution has been described. In an ongoing 3GPP study, "One Tunnel study" reported in TR 23.809, the possibility to bypass SGSN with the GTP-U tunnels is investigated. How this can be done for MBMS has still not been described, but is included in this invention.

The introduction of the multicast application on the user layer requires coordination on the transport layer, in particular between the nodes in respect to the multicast data delivery. In PLMNs with multiple GGSNs there is currently no coordination and synchronization mechanism for multicast groups between the GGSNs. Similarly there is no coordination or synchronization mechanism described for the TEIDs allocated by multiple GGSNs used for MBMS distribution using GTP-U and IP multicast.

It may thus happen that multiple GGSNs in a PLMN are dealing with the same multicast group, resulting in multiple multicast groups and multicast connections. Furthermore, if the multicast group info is distributed in the PLMN, the PLMN operator has no means to base any analysis on the group membership in the PLMN. It means the operator can not restrict additional members or base any charging decision on the total group membership in the PLMN.

SUMMARY OF THE INVENTION

The object of the present invention is to provide a solution for solving at least some of the above mentioned problems. This is provided in a number of aspects in which a first aspect a telecommunication gateway device for facilitating distribution of multimedia broadcast multicast services, i.e. MBMS, in a telecommunications network is provided, arranged with instruction sets for:
receiving an MBSM session start message from a broadcast/multicast service center;
sending control traffic on a control network;
sending as control traffic to a serving node an MBMS session start request message and including a common tunnel end-point identifier, i.e. cTEID, in the MBMS session start request message;
receiving information from the serving node indicating the acceptance of using IP multicast;
sending media content on an IP multicast backbone to hosts that have joined the multicast group using the cTEID;

The device may further comprise an instruction set for synchronizing the cTEID with other infrastructure devices in order to ensure the uniqueness of the cTEID.

The device may even further comprise an instruction set for receiving a unique cTEID from another infrastructure device.

The device may yet further comprise an instruction set for creating at least one network communication tunnel to at least one of a serving and a control node for fallback purposes.

Another aspect of the present invention, a telecommunication serving device for facilitating distribution of multimedia broadcast multicast services, i.e. MBMS, in a telecommunications network is provided, arranged with instruction sets for:

receiving an MBSM session start message from a telecommunication gateway device including a common tunnel end-point identifier, i.e. cTEID;

sending to a control device an MBMS session start request message and including the common tunnel end-point identifier, i.e. cTEID, in the MBMS session start request message;

receiving information from the control device indicating the acceptance of using Internet Protocol (IP) multicast distribution;

The serving device may further comprise an instruction set for sending an internet group management protocol, i.e. IGMP, join message or membership report message (IGMPv2 & IGMPv3) to an Internet Protocol multicast backbone.

The serving device may further comprise an instruction set for creating a tunnel for distribution of payload data if the control device indicates a non acceptance of using IP multicast distribution.

Yet another aspect of the present invention, a telecommunication control device is provided for facilitating distribution of multimedia broadcast multicast services, i.e. MBMS, in a telecommunications network, arranged with instruction sets for:

receiving, from a telecommunication serving device, an MBMS session start message including a common tunnel end-point identifier, i.e. cTEID;

sending, to the serving device, an MBMS session start response message with an indication that it accepts an Internet Protocol multicast distribution;

sending an internet group management protocol, i.e. IGMP, join message or membership report message (IGMPv2 & IGMPv3) to an Internet Protocol multicast backbone.

The control device may further comprise the step of sending an internet group management protocol, i.e. IGMP, leave message or membership report message (IGMPv2 & IGMPv3) to an Internet Protocol multicast backbone to cancel multicast reception (when an MBMS Session Stop message has been received).

Still another aspect of the present invention, a telecommunication infrastructure network is provided for facilitating distribution of multimedia broadcast multicast services, i.e. MBMS, comprising:

a broadcast/multicast service node, i.e. BM-SC;
a gateway node;
at least one serving node; and
at least one control node;

wherein the BM-SC is connected to the gateway node which in turn is connected to the serving node via two interfaces, a control interface and a backbone interface, the control node is in turn connected to the serving node and/or the gateway node, the gateway node is arranged with instruction sets for:

receiving an MBSM session start message from the broadcast/multicast service center;

sending control traffic on the control interface;

sending as control traffic to the serving node an MBMS session start request message and including a common tunnel end-point identifier, i.e. cTEID, in the MBMS session start request message;

receiving information from the serving node indicating the acceptance of using IP multicast;

sending media content on an IP multicast backbone to hosts that have joined the multicast group using the cTEID;

The present invention is also provided as a method for facilitating distribution of multimedia broadcast multicast services, i.e. MBMS, in a telecommunication network, comprising the steps of:

receiving in a gateway node an MBSM session start message from a broadcast/multicast service center, i.e. BM-SC;

sending control traffic on a control network;

sending as control traffic from the gateway node to a serving node (24) an MBMS session start request message and including a common tunnel end-point identifier, i.e. common TEID, in the MBMS session start request message;

receiving information from the serving node indicating the acceptance of using IP multicast;

sending media content on an IP multicast backbone to hosts (25, 26, 31) that have joined the multicast group using the common TEID;

The common TEID may be unique for each MBMS session.

The method may further comprise the step of synchronizing the common TEID with other gateway nodes connected to the same BM-SC.

The host may be at least one of a serving node and a control node;

The serving node may be a serving GPRS support node, i.e. SGSN, and the control node is one of a Base Station Controller, i.e. BSC, and a Radio Network Controller, i.e. RNC.

The common TEID may be identified by setting at least one bit of a TEID structure to indicate an active state.

The method may further comprise the step of using a fallback procedure comprising setting up GTP tunnels between the gateway and the serving nodes and between the serving nodes and the control nodes.

The method may further comprise a step of joining of the control device to the IP multicast backbone comprises sending a message indicative of the interest to join to the IP multicast backbone, step of joining may comprise sending an internet group management protocol, i.e. IGMP, join message or membership report message (IGMPv2 & IGMPv3) to an Internet Protocol multicast backbone or using a multicast listener discovery, i.e. MLD, message.

Another aspect of the present invention, a signal for transporting multimedia broadcast multicast service, i.e. MBMS, in a telecommunications network is provided, comprising an Internet protocol multicast address, a GPRS tunnel protocol tunnel end-point identifier, an MBMS multicast address, and media content data.

By the invention an efficient backbone distribution between GGSN and SGSN can be utilized for MBMS service. Without this method the GGSN may be heavily downloaded from copying MBMS packets to the Gn interface.

BRIEF DESCRIPTION OF THE DRAWINGS

In the following the invention will be described in a non-limiting way and in more detail with reference to exemplary embodiments illustrated in the enclosed drawings, in which:

FIG. 2 illustrates schematically a network topology according to the present invention;

DETAILED DESCRIPTION OF PREFERRED EMBODIMENTS

Figure 1:
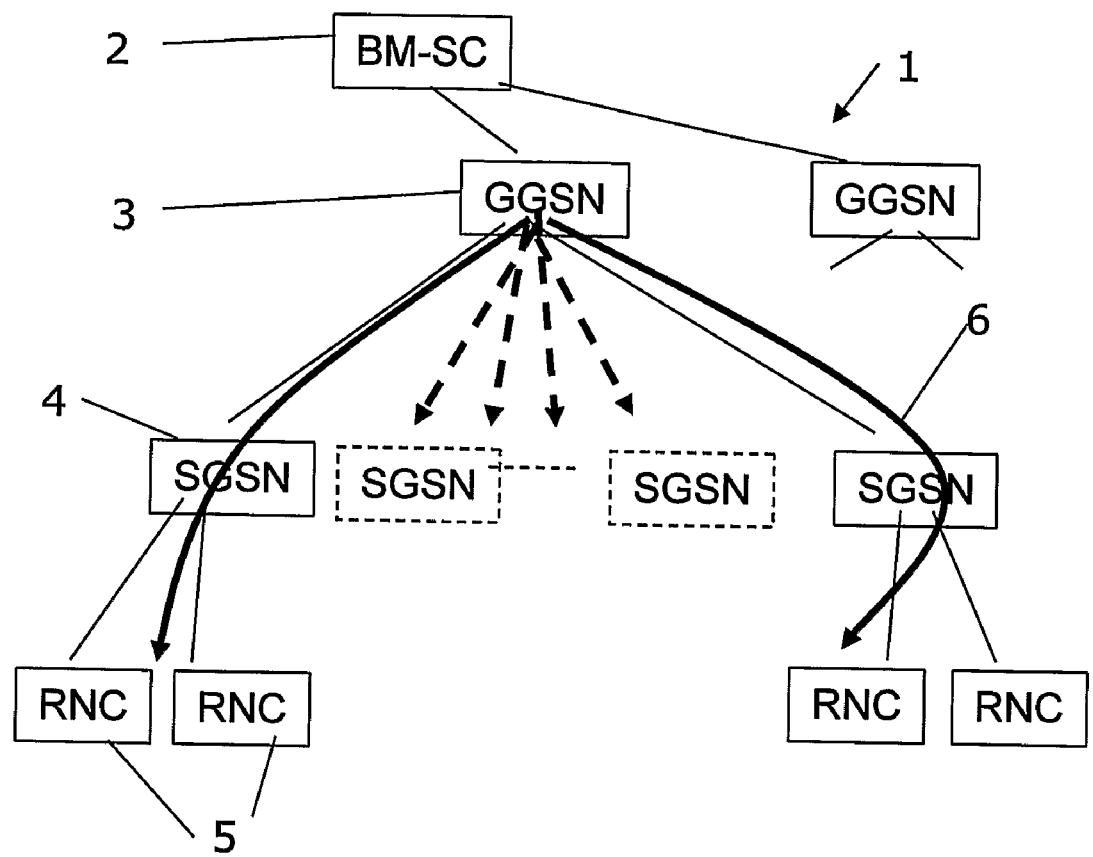
Figure 2:
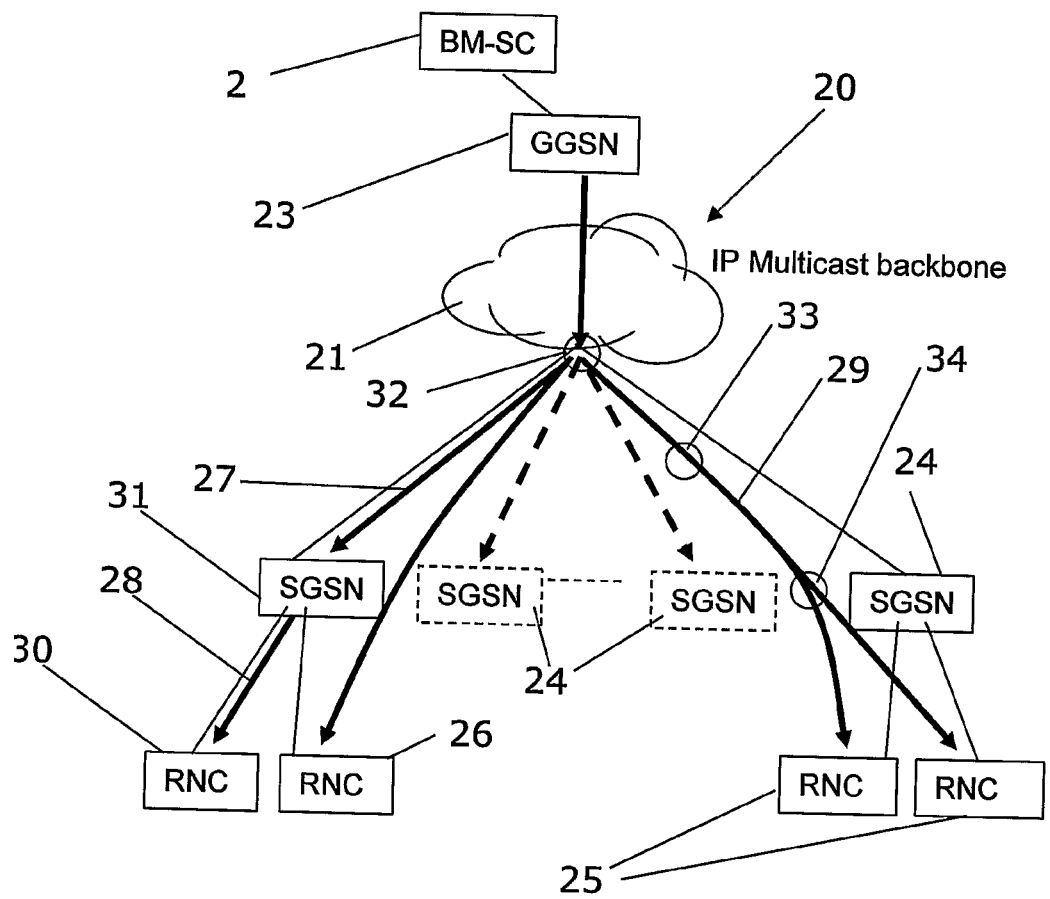
FIG. 2 illustrates schematically a network topology according to known techniques.

In FIG. 2 reference numeral 20 generally indicate a telecommunication infrastructure network arranged so as to allow for broadcast/multicast services. A broadcast/multicast service center (BM-SC) 2 is arranged to handle broadcasting and/or multicasting of media content supplied form a media content server (not shown). The BM-SC is connected to at least one GGSN 23 (Gateway GPRS Service Node) which in turn is connected to an IP multicast backbone 21. In the IP multicast backbone a number of routers 32, 33, and 34 route media content (i.e. so called payload) to RNCs 25, 26 (Radio Network Controller) which have been setup as subjects for delivery of media content. In some cases the RNC is not able to receive the payload directly in a manner according to the present invention; payload traffic is then sent first to a SGSN 31 (Serving GPRS Service Node) which relays the payload traffic to the RNC. The SGSNs 24 is not used for payload distribution if the RNC can directly receive payload traffic. According to the present invention IP multicast backbone 29 are used between the GGSN 23 via at least one router 32 on the IP multicast backbone and each RNC part of the multicast network. However, in the case the RNC is not part of the multicast network using the present invention the GGSN 23 will send the data on the IP multicast network to the SGSN 31 via routers on the backbone, i.e. the SGSN 31 will act as host in the IP multicast network and the SGSN 31 will set up a tunnel 28 between the SGSN 31 and the RNC 30. In case of the SGSN is not supporting the present invention the GGSN will have to set up a standard GTP tunnel 27 to the SGSN 31.

Instead of having the GGSN 23 duplicate and send the MBMS payload to a number of SGSNs 24 using point-to-point tunnel transmission in the GPRS backbone 21, it would be preferable to do IP multicast from GGSN 23 on the backbone. It is needed to set up an IP multicast distribution between GGSN 23 and SGSNs 25, 26 (or directly to RNCs which support IP multicast). The GGSN will then need to send just one copy of the MBMS payload packet to the GPRS backbone, and the routers on the IP Multicast backbone will handle the duplication and packet distribution to the SGSNs, see FIG. 2.

The leftmost RNC 30 in FIG. 2 above doesn't support IP multicast distribution and does therefore get the MBMS payload via normal MBMS unicast from the SGSN 31. All RNCs 25 under the rightmost SGSN in FIG. 2 support IP multicast distribution and therefore the SGSN 24 doesn't need to be part of the (user plane) distribution tree at all but is only part of the control plane of the communication setup.

Figure 4:
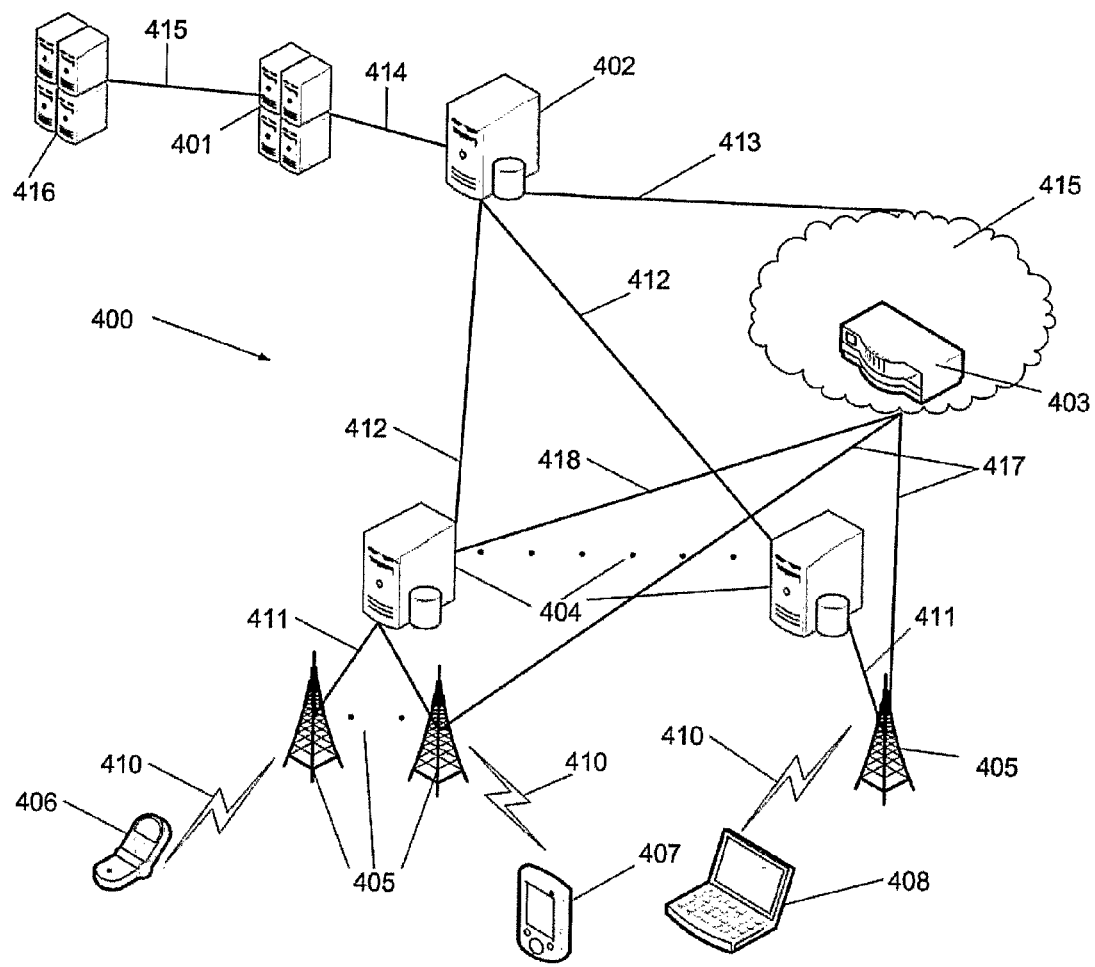
FIG. 4 illustrates schematically the network topology of FIG. 2 in more detail.

FIG. 4 illustrate a similar network as was described in FIG. 2, with the difference that a media content server 416 and the mobile stations 406, 407, and 408 is also indicated. In FIG. 4, reference numeral 400 indicates the infrastructure network configuration. A media content server 416 sends multicast content via a connection 415 to a BM-SC 401 which is in control of the multicast service. The BM-SC sends multicast control and user plane information via a connection 414 to a GGSN 402 which in turn sends control plane traffic to the SGSN's 404 in the network via control plane connections 412. When connections are setup, user plane information is transmitted 413 via the IP multicast backbone 415 via at least one router 403 on the backbone either directly 417 to each RNC 405 that has the present invention implemented or indirectly 418, 411 via an SGSN 404. The RNC's are responsible for transferring the user plane traffic further to the mobile stations 406, 407, 408. Mobile stations may be any suitable communication device or computational device with communication capabilities, for instance but not limited to mobile phone, personal digital assistant (PDA), laptop, MP3 player or portable DVD player (or similar media content devices), digital camera, or even stationary devices such as a PC. A PC may also be connected via a mobile station as the end station of the broadcasted/multicasted media.

The backbone multicast service is only used for efficient distribution and shall not be confused with the user multicast service.

The invention will now be described in more detail.

Figure 3:
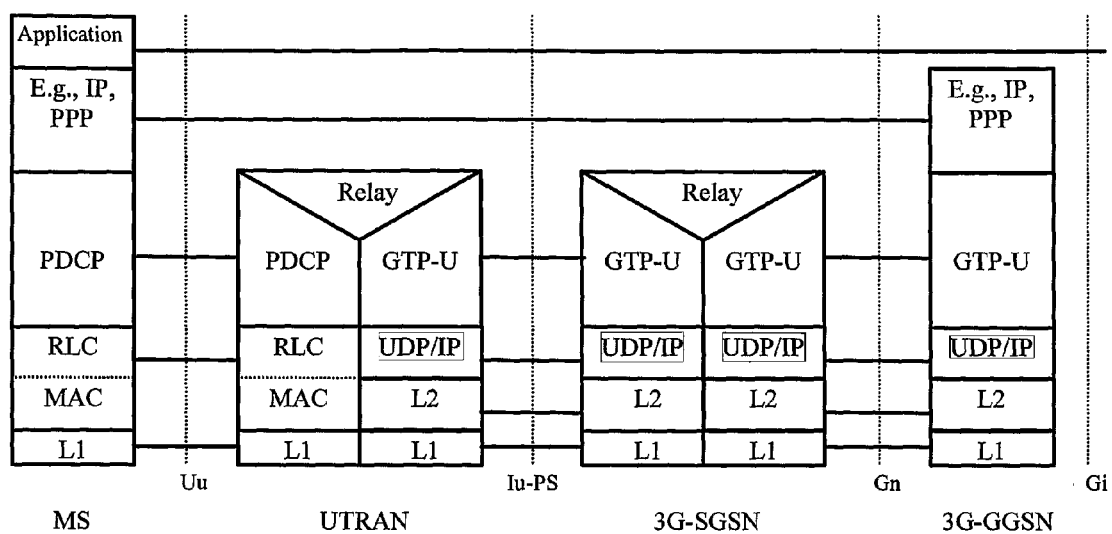
FIG. 3 illustrates schematically a protocol stack model according to the present invention.

A protocol related view of the basic idea is reflected in the FIG. 3. FIG. 3 shows architecture of a network as standardised in 3GPP. However, this should not be seen as a restriction for the invention. FIG. 3 shows a situation where a mobile station MS communicates over the Uu interface with an access network UTRAN. The Iu-PS interface connects UTRAN with 3G-SGSN, which communicates over the Gn interface with the 3G-GGSN. FIG. 3 provides an overview of the different protocol-stacks in the different nodes used in the UMTS. The following description concentrates merely on the two IP layers in the packet switched domain, depicted as IP, PPP and UDP/IP, and on the GTP-U layer. In FIG. 3 the other protocols are mentioned because of complementary reasons.

The above-mentioned requirements and restriction for the functionality and communication manner of the introduced packet switched oriented nodes like SGSN or GGSN have their impact on the developed protocol stacks. As a result of the function of the GGSN as a router and as an interface to the external networks the IP layer below the application layer has been introduced. Further due to the restriction of having an IP network between the GGSN and the SGSN an IP logical connection is introduced as a transport mean, below the GTP-U layer.

Therefore in respect to FIG. 3 there are two IP layers, in the following described as an application IP and a transport IP layer. The application IP layer is located in the protocol stack directly below the application protocols, Application, and connecting the mobile station and the 3G-GGSN. This IP layer is transparent to the packet switching network, this is depicted in the FIG. 3 by a direct line going from the MS to the 3G-GGSN. The second IP layer is the transport IP layer used for the transmission between the SGSN, GGSN and UTRAN. The payload traffic is transported across the Gn encapsulated in an application-specific tunneling protocol, the GPRS Tunneling protocol GTP, which is an example of a transport layer protocol for tunneling. GTP packets use UDP as a transport protocol. However, there are different tunneling protocols, which are responsible for building a tunnel. GTP is merely an example and should not be limiting to the invention.

The marked UDP/IP layer will use the IP Multicast service with the changes proposed here. It can be seen that the invention using IP multicast addressing in the marked UDP/IP layer i.e. the transport IP layer, does not change the current standardised 3GPP protocol stack. This way the impact on nodes is minimized when implementing IP multicast distribution. The packet forwarding function in MBMS supporting nodes is basically unaffected when IP multicast distribution is introduced.

Signalling for IP Multicast Distribution for MBMS

1. BM-SC starts an MBMS service by sending Session start to the GGSN, including parameters for MBMS.
2. GGSN sends an MBMS_Session_Start-request to all SGSNs in its "List of downstream nodes" (alternatively the BM-SC may provide a list of RNCs in the "List of downstream nodes" parameter in the Session Start message to GGSN. The GGSN (or corresponding service node) would then signal directly to the RNC, using a new Iu interface. This does not exist in the current 3GPP CN architecture but may exist in future 3GPP architectures, e.g. in Evolved Packet Core of the 3GPP SAE study), and includes a proposed "IP Multicast address for backbone distribution" (new GTP IE), and also a proposed common TEID-U (new GTP IE). If the Source-Specific-Multicast is used an "Address to multicast Source" (e.g. GGSN) is also included in the new GTP IE. The GGSN shall select this proposed common TEID-U to be unique for each MBMS service to ensure that the receiving nodes (RNC and 2G-SGSN) receives unique TEIDs for each MBMS service.
3. SGSN accepts the Session start and sends an MBMS_Session_Start-response to GGSN including an indication that IP Multicast distribution is accepted and sets the SGSN Address for User Plane IE to the "IP Multicast address for backbone distribution" received from the GGSN.
   If an SGSN does not accept the proposed IP Multicast address for backbone distribution (or the proposed TEID-U), it will indicate this by including an ordinary unicast SGSN Address for user traffic and TEID-U in the MBMS_Session_Start-response.
   The SGSN sends an MBMS session start request message to each RNC (or BSC) connected downstream and receives a MBMS session start response with an indication that IP multicast is accepted.
   If an RNC does not accept the proposed IP Multicast address for backbone distribution (or the proposed TEID-U), SGSN will indicate this by including an ordinary unicast RNC IP address for user traffic and TEID-U in the MBMS_Session_Start-response.
4. SGSN sends an IGMP-message (IPv4) or MLD-message (IPv6) to the IP multicast backbone to join the distribution multicast. This may be an IGMPv3 or MLDv2 message e.g. when SSM is used (RFC 4604).
5. GGSN can send only one copy of the MBMS user payload to the backbone, where duplication of the packets is done and distributed to the SGSNs, with the address "IP Multicast address for backbone distribution"
6. When the SGSN receives the payload on the address "IP Multicast address for backbone distribution", SGSN checks the TEID-U and finds the associated MBMS_Bearer_Context and sends the packet using the usual MBMS method down to the RNCs.

The GGSN may advantageously select the proposed common TEID-U to be unique for each MBMS service/session to ensure that the receiving nodes (RNC and 2G-SGSN) receive unique TEIDs for each MBMS service. By using the MBMS_Session_Start-request message it is ensured that the system may deal with both broadcast and multicast configurations.

If there are multiple GGSNs providing MBMS services, these GGSNs shall use different common TEID-Us. This common TEID-U and the IP Multicast addresses used can be synchronized by
a) configuration in GGSNs, and/or
b) signalling between GGSNs, and/or
c) TEID assignment function in separate network device, e.g. BM-SC, and signalling from the separate network device to GGSNs.

If an SGSN or RNC receives a Session Start Request with a common TEID-U that is already used in the SGSN or RNC, the node shall fallback to Rel-6 MBMS user plane by allocating a new TEID-U and returning that in the Session Start Response instead of the proposed Common TEID-U.

To completely avoid conflicting TEID-Us and the subsequent fallback to Rel-6 MBMS user plane, a division of the TEID-U space may be used. This may for example by allocating one of the 32 bits in the TEID-U to indicate MBMS. That bit will then always be set in common TEID-Us allocated by GGSNs, but never in TEID-Us allocated internally in SGSNs or RNCs.

It should be noted that this method is equally valid for OTS (One Tunnel Solution, wherein user plane communication (i.e. payload) is communicated directly between the GGSN and the RNC as described in TR 23.873), with the addition that the SGSN informs the GGSN about if RNC has accepted the proposed IP Multicast address and proposed common TEID-U, and informs the RNC about the "IP Multicast address for backbone distribution" and about the common TEID-U to use for MBMS payload reception for the particular MBMS service (impact/new IE in RANAP). The RNC then has to send an IGMP-message (IPv4) or MLD-message (IPv6) to the backbone in order to receive the payload from the GGSN. Also, in this case, the SGSN must provide GGSN with a list of RNC IP-addresses and RNC TEID's for all RNCs not accepting IP-multicast.

It should further be noted that the only difference between MBMS multicast-mode and MBMS broadcast-mode is in how the distribution tree and in particular GGSN's "List of Downstream Nodes" is built up. In the MBMS broadcast-mode, the list is received from BM-SC. In the MBMS multicast-mode, it is built up by MBMS_Registration-requests received from SGSNs with mobiles (MS) wanting to join a multicast-session.

It should also be noted that the solution will work also for roaming OTS, since the home-GGSN will treat the visited GGSN (xGGSN i.e. GGSN Proxy) as an SGSN (for OTS using the GGSN Proxy method). It is the xGGSN that initiates IP-multicast in its own backbone. That is, the GGSN Proxy may choose not to use multicast transport over the external network (i.e. GRX) and the GGSN Proxy will then return its own IP address and TEID to get the MBMS payload over a traditional MBMS GTP-U unicast tunnel. Multicast between different operators' network domains should be avoided because of both security, technical and charging problems. The method described above for roaming may work in this way for next generation 3GPP mobile core network specifications a.k.a. SAE, where the Visited Anchor takes the role of the GGSN Proxy. Another method that may work for roaming is if a PLMN has an Edge Router at the border to the GRX network which acts to receive unicast from the Home PLMN and send multicast within the Visited PLMN. A third method can be that with using SSM, Source routed multicast protocol, it may be acceptable to use IP Multicast transport even between PLMNs.

The solution will work for ISRAU in the Multicast case, since GGSN will always send an MBMS_Session_Start-request to the new SGSN.

MBMS Bearer Contexts

The GGSN maintains MBMS_Bearer_Contexts for the MBMS services. With the proposed method the GGSN will maintain one common MBMS_Bearer_Context for all downstream nodes for one service.

As an example: an MBMS_Bearer_Context for a service 001, where SGSNs 2, 3 and 4 have accepted to belong to the IP Multicast distribution tree, may look like this (Note that SGSN 1 has refused to belong to IP Multicast distribution, and the GGSN has to copy packets individually to SGSN 1):

```
MBMS_Bearer_Context_001
APN = MBMS_APN_01
...
List_of_Downstream_Nodes {
    SGSN 1
    IP-address              192.168.100.10 TEID-U 10
    SGSN 2, SGSN 3, SGSN 4
    Multicast-address       239.192.200.21 TEID-U 11
}
```

GGSN shall have one TEID-C per SGSN and MBMS_Bearer_Context. (One TEID-C per SGSN and MBMS_Bearer_Context for OTS). GGSN has one common TEID-Upper MBMS_Bearer_Context for all downstream nodes that accept IP Multicast (proposed by the GGSN). GGSN has one TEID-Upper unicast SGSN/RNC and MBMS_Bearer_Context.

Another example when Source Specific Multicast (SSM) according to RFC 4607 and RFC 4604 is used for IP multicast distribution, and direct tunneling (One Tunnel) from GGSN to RNC is used, an MBMS_Bearer_Context for a service may look like this:

```
MBMS_Bearer_Context_001
APN = MBMS_APN_01
...
List_of_Downstream_Nodes {
    SGSN 1
    IP-address              192.168.100.10 TEID-U 10
    SGSN 2, SGSN 4, RNC 31, RNC 32, RNC 33
    Multicast-address       232.192.200.21 TEID-U 11
    Address-to-multicast-Source 192.168.111.21
}
```

Error Handling

When an SGSN or RNC restarts or otherwise fails, GGSN will receive an Error-indication, when the failing node receives a downlink payload packet for which it has no active GTP-U tunnel. When IP-multicast is used, GGSN will not be able to figure out from the fields in the Error-indication, from which SGSN (or RNC) the message originated.

However, in most cases, if an SGSN (or RNC) refuses to receive MBMS-payload, this will be due to a restart or major failure, why failing PDP contexts will identify the failing node.

A unique problem would occur only when an SGSN (or RNC for OTS) accepts ordinary PDP context payload, but for some reason does not accept MBMS-payload, received via IP-multicast, even though it has already sent an IGMP-message (IPv4) or MLD-message (IPv6) to the IP-multicast backbone. This case should be sufficiently infrequent for the below two remedies to form a sufficient solution.

Remedy in broadcast case: GGSN can upon reception of an unidentified error indication retransmit the MBMS_Session_Start-request to all SGSNs/RNCs in its list of downstream nodes. Active SGSNs will simply return an acknowledgment and accept the message without further action. Failing SGSNs will not respond and will be removed from GGSN's "List of Downstream Nodes" for the MBMS_Bearer_Context.

Remedy in multicast case: No retransmission of the MBMS_Session_Start-request is allowed. All MBMS_UE_Contexts pertaining to the failing SGSN and this MBMS_Bearer_Context shall be deleted. However, this will not be possible, why these MBMS_UE_Contexts will remain hanging until the MBMS_Bearer_Context is deactivated.

Should the above remedies for some reason not be acceptable, GGSN would have to inspect the header of the IP-datagram containing the Error-indication. This header contains the unicast IP-address of the SGSN which sent the Error-indication.

It should be noted that a failing SGSN/RNC should send an IGMP Leave to the backbone multicast network. If the failing node sends an IGMP Leave, or in some other way signals to the IP multicast backbone that it does not want to receive multicast downlink messages, GGSN will not receive repeated Error-indications, even if the failing node is not removed from GGSNs "List of Downstream Nodes".

The IGMP periodic "Query Request/Query Response" mechanism to check if there are still listeners of a multicast session, will eventually switch off the delivery of MBMS multicast transported payload in the IP backbone.

In case the operator uses multiple GGSNs for MBMS, each GGSN forms its own distribution tree. This is not different from how it works already today. The difference is that whole or part of the distribution tree now will use IP multicast for transport.

It is advantageous that the IP multicast addresses are synchronized between GGSNs used for MBMS. Also, the common TEID-U is advantageously synchronized. Different alternative solutions for this synchronization may be used:

Configuration (configuring different ranges in different GGSNs)

Signalling between GGSNs (to avoid conflicting addresses and TEID-Us)

Figure 5:
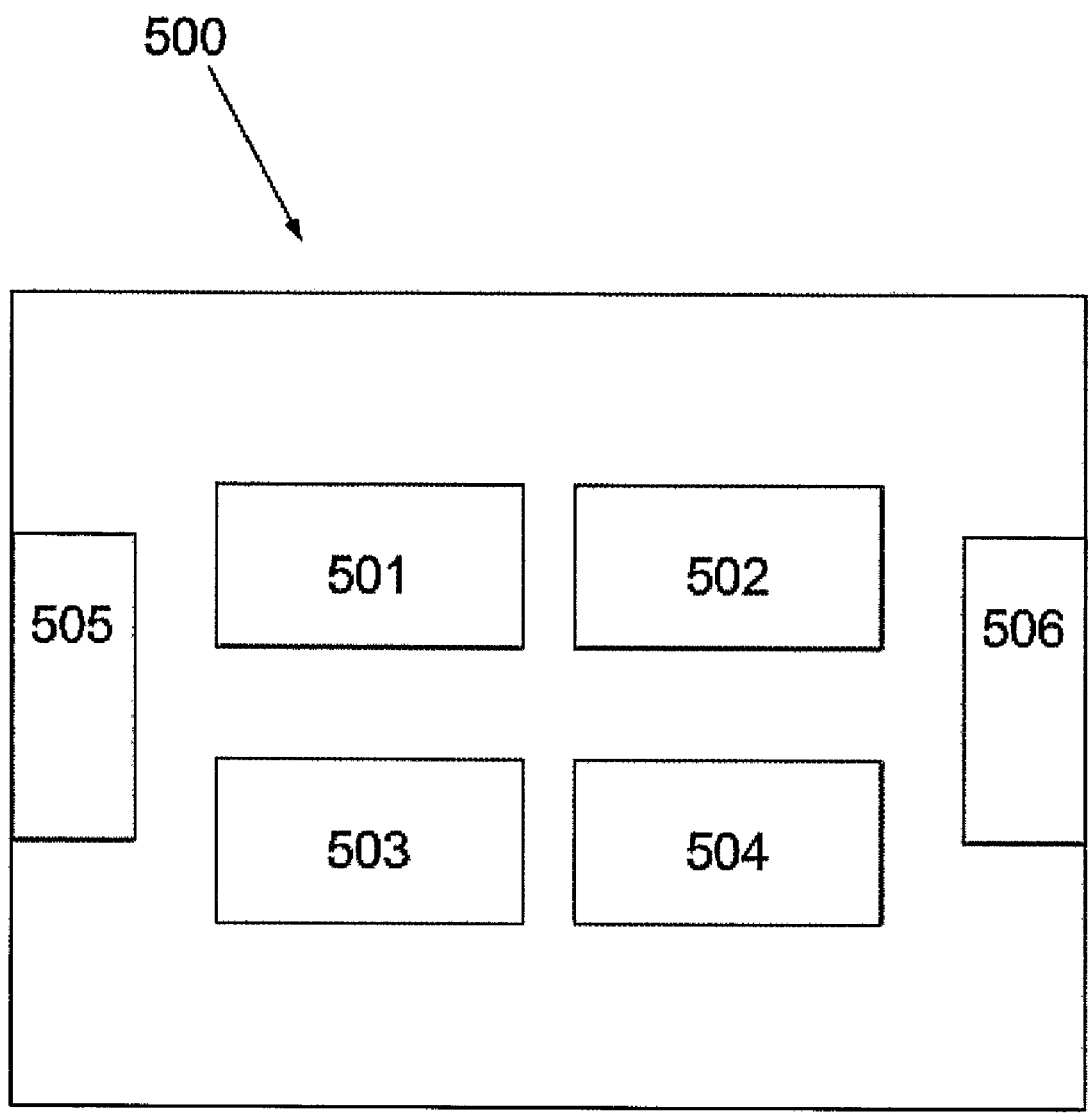
FIG. 5 illustrates schematically in a block diagram an infrastructure device according to the present invention.

Synchronization function in BM-SC and signalling to between GGSN and BM-SC for synchronization The above mentioned MBMS solution is implemented in a number of infrastructure nodes as instruction sets in software. FIG. 5 illustrates in a schematic block diagram an infrastructure node (GGSN, SGSN, or RNC) according to the present invention (e.g. a support node), wherein a processing unit 501 handles communication data and communication control information. The infrastructure node 500 further comprises a volatile (e.g. RAM) 502 and/or non volatile memory (e.g. a hard disk or flash disk) 503, and an interface unit 504. The infrastructure node 500 may further comprise a downstream communication unit 505 and an upstream communication unit 506, each with a respective connecting interface. All units in the infrastructure node can communicate with each other directly or indirectly through the processing unit 501. Software for handling communication to and from the mobile units attached to the network is at least partly executed in this node and may be stored in the node as well; however, the software may also be dynamically loaded upon start of the node or at a later stage during for instance a service interval. The software can be implemented as a computer program product and distributed and/or stored on a removable computer readable media, e.g. diskette, CD (Compact Disk), DVD (Digital Video Disk), flash or similar removable memory media (e.g. compactflash, SD secure digital, memorystick, miniSD, MMC multimediacard, smartmedia, transflash, XD), HD-DVD (High Definition DVD), or Bluray DVD, USB (Universal Serial Bus) based removable memory media, magnetic tape media, optical storage media, magneto-optical media, bubble memory, or distributed as a propagated signal via a network (e.g. Ethernet, ATM, ISDN, PSTN, X.25, Internet, Local Area Network (LAN), or similar networks capable of transporting data packets to the GGSN).

Figure 6:
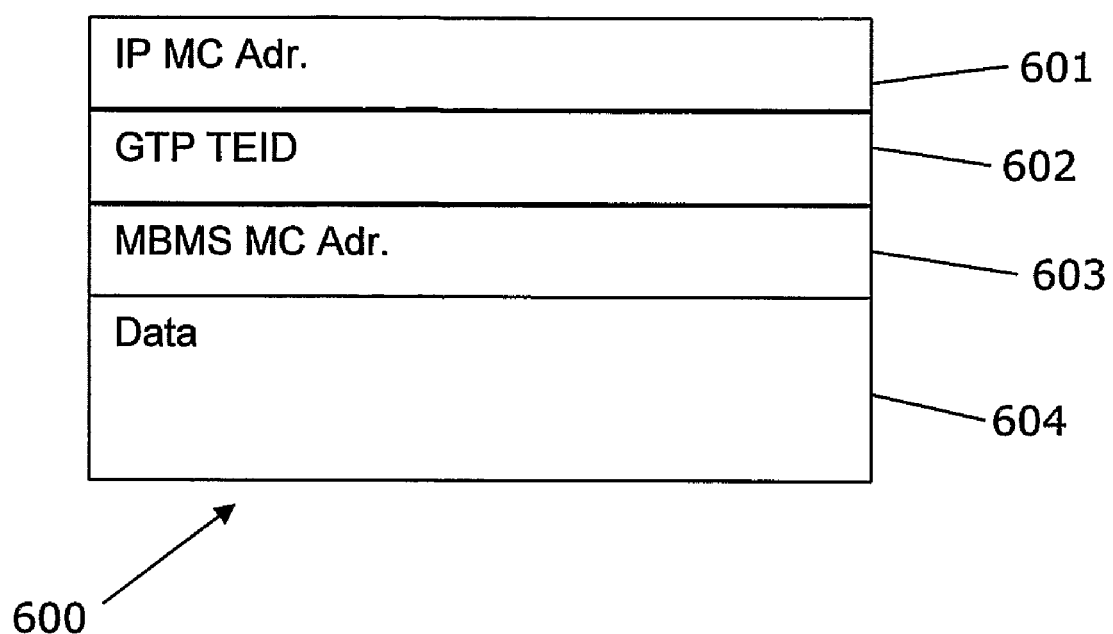
FIG. 6 illustrates schematically a data packet according to the present invention.

FIG. 6 illustrates schematically a data packet 600 according to the present invention. The data packet 600 comprise a header 601 with an IP multicast address and a GTP TEID 602. Inside this a MBMS Multicast address 603 is located and finally the payload 604 with media content data.

An advantage of this invention is that efficient backbone distribution between GGSN and SGSN can be used for MBMS service. Without this method the GGSN may be heavily downloaded from copying MBMS packets to the Gn interface.

Further the solution covered in this invention focuses on the packet switched domain in a GSM or UMTS network. However, the solution can generally be applied to networks with 2 IP layers, one application IP-level and one transmission IP-level, such as is the case when tunneling is applied. In general, the idea can be applied whenever tunneling is used, for example in GTP, L2TP, IPSec, and Mobile IP. Also, for cases where the transport layer is based on another technology that supports multicast transmission, like for example ATM, the mechanisms may be applied.

Further, it should be understood that the same mechanisms can be applied for example to create a multicast transport group for application like point-to-multipoint streaming (RTSP) or conversational multimedia services (SIP).

The invention will now be discussed in more detail in relation to changes in the standard for MBMS within the 3GPP: TS23.246 (which is incorporated herein by reference).

UTRAN/GERAN is responsible for efficiently delivering MBMS data to the designated MBMS service area. Efficient delivery of MBMS data in multicast mode may require mechanisms in the UTRAN/GERAN, e.g. the number of users within a cell prior to and during MBMS transmission could be used to choose an appropriate radio bearer. MBMS transmissions may be initiated and terminated intermittently. The UTRAN/GERAN shall support the initiation and termination of MBMS transmissions by the core-network. Further, the UTRAN/GERAN shall be able to receive MBMS data from the core-network over Iu bearers shared by many UEs. UTRAN may also support reception of MBMS data from the core-network over IP multicast. The UTRAN/GERAN shall support both intra-RNC/BSC and inter-RNC/BSC mobility of MBMS receivers. Mobility is expected to cause limited data loss. Therefore, MBMS user services should be able to cope with potential data loss caused by UE mobility.

The UTRAN/GERAN shall be able to transmit MBMS user service announcements, paging information (non MBMS specific) and support other services in parallel with MBMS (for example depending on terminal capabilities the user could originate or receive a call or send and receive messages whilst receiving MBMS video content).

SGSN

The SGSN's role within the MBMS architecture is to perform MBMS bearer service control functions and to provide MBMS transmissions to UTRAN/GERAN. In case of MBMS Multicast, MBMS bearer service control functions are performed for each individual UE. In case of MBMS Broadcast mode, the control functions are performed independently of UEs. When IP multicast is used for MBMS transmissions the SGSN may be bypassed in the 3G case, i.e. MBMS data sent directly from GGSN to RNC. The SGSN shall provide support for intra-SGSN and inter-SGSN mobility procedures. Specifically this requires the SGSN to store a user-specific MBMS UE context for each activated multicast MBMS bearer service and to pass these contexts to the new SGSN during inter-SGSN mobility procedures. The SGSN shall be able to indicate its MBMS support to the UE as well as it shall be able to synchronise with the UE, which of the UE's MBMS UE contexts are still active. The SGSN shall be able to generate charging data per multicast MBMS bearer service for each user. The SGSN does not perform on-line charging for either the MBMS bearer service or the MBMS user service (this is handled in the BM-SC).

The SGSN shall be able to establish Iu and Gn bearers shared by many users upon receiving a session start from the GGSN. Likewise, the SGSN shall be able to tear down these bearers upon instruction from the GGSN.

GGSN

The GGSN role within the MBMS architecture is to serve as an entry point for IP multicast traffic as MBMS data. Upon notification from the BM-SC the GGSN shall be able to request the establishment of a bearer plane for a broadcast or multicast MBMS transmission. Further, upon BM-SC notification the GGSN shall be able to tear down the established bearer plane. Bearer plane establishment for multicast services is carried out towards those SGSNs and/or RNCs that have requested to receive transmissions for the specific multicast MBMS bearer service. For broadcast service, bearer plane establishment is carried out towards those SGSNs and/or RNCs included in the "List of downstream nodes" received from an upstream node, in particular in the GGSN, received from the BM-SC. For an optimized bearer plane, IP multicast transport may be used within the core network. The bearer plane is then established between the GGSN and SGSN and/or directly between GGSN and RNCs.

The GGSN shall be able to receive MBMS specific IP multicast traffic and to route this data to the proper GTP tunnels set-up as part of the MBMS bearer service.

The GGSN may also provide features that support the MBMS bearer service that are not exclusive to MBMS. Examples are:

Message Screening (not needed if the MBMS sources are internal in the PLMN);
Charging Data Collection;
Flow Based Charging.

MBMS Bearer Context

The MBMS Bearer Context, which is referred to as MBMS Service Context in RAN, contains all information describing a particular MBMS bearer service and is created in each node involved in the delivery of the MBMS data. For MBMS Multicast mode, an MBMS Bearer Context is created in the SGSN and GGSN when the first MBMS UE Context is created in the node or when a downstream node requests it. For MBMS Broadcast mode, an MBMS Bearer Context is created in the SGSN and GGSN when the MBMS Session Start message is received from an upstream node. The MBMS Bearer Context is statically configured in the BM-SC Proxy and Transport Function; how this is done is out of the scope of this specification. The MBMS Bearer Context is created in the Iu mode BSC and in SRNC when a first MBMS UE Context is created in BSC/SRNC. MBMS Session Start procedure may create MBMS Bearer Context in a BSC/RNC which has no MBMS Bearer Context yet.

An MBMS Bearer Context, once created, can be in one of two states reflecting the bearer plane resource status of the corresponding MBMS bearer service:

'Active' reflects the state of an MBMS Bearer Context in which bearer plane resources are required in the network for the transfer of MBMS data. This state is maintained as long as there is a corresponding MBMS session ongoing.

'Standby' reflects the state of an MBMS Bearer Context in which no bearer plane resources are required in the network for the transfer of MBMS data. This state is maintained as long as there is no corresponding MBMS session ongoing.

Quality-of-Service

It shall be possible for the network to control quality-of-service parameters for sessions of multicast and broadcast MBMS bearer services. All QoS attributes related to the UMTS bearer service described in TS 23.107 are applicable to MBMS bearer services. Compared to point-to-point bearer services the following limitations exist:

For traffic class, only the background and streaming classes shall be supported.

For SDU error ratio, only higher values are supported, i.e. the values describing higher numbers of lost or corrupted SDUs (actual values are for the background and streaming classes are 10-2 and 10-1).

For maximum bit-rate, see the values described in TS 22.246.

For Guaranteed bit rate of the Streaming Traffic Class: depending on radio resource usage by other services, some cells of the MBMS Service Area may not have sufficient resources available for a MBMS Session. The RAN may decide not to establish RB in cells where requested resources are not available. The RAN does not reject a MBMS Session Start Request message even if one or more cells do not have enough resources to establish radio bearers.

MBMS bearer services of background class are best suited for the transport of MBMS user services such as messaging or downloading. Buffering, shaping schemes and packet dropping may be applied to the traffic flow to adapt to the available resources and changing network conditions. The total transfer time is not critical for background class bearer services since the content must normally have been received in totality and stored in the UE before the user can access it.

MBMS bearer services of streaming class are best suited for the transport of MBMS user services such as streaming. As for point-to-point bearer services, the network should minimise the packet transfer delay (and delay jitter) of streaming class bearer services as far as possible. Packet dropping should be the preferred traffic conditioning action applied to the traffic flow to adapt to the available resources.

The principle difference between background and streaming classes for MBMS is the support of a guaranteed bit-rate in the streaming case. No indication is provided to the UE in cases where the RAN cannot provide the requested QoS. As a result, some UEs may not receive the MBMS session or parts of it. For background class, the RAN may continue to distribute data in congestion conditions but at potentially high packet loss rates, therefore the MBMS user service will have to provide sufficient redundancy within the data to be able to cope with the high packet loss.

MBMS user services that would normally use MBMS bearer services of background class may however decide to use a streaming class MBMS bearer service if the MBMS user service cannot cope with high packet loss.

The Allocation and Retention Priority of the MBMS bearer service allows for prioritisation between MBMS bearer services, and between MBMS bearer services and non MBMS bearer services.

As the MBMS bearer service transfers data to many UEs in parallel and because of the lack of feedback channel on radio level low SDU error ratios are difficult to achieve. When the resulting packet error ratio is not suitable for the MBMS user service or when prevention of data loss is required, an MBMS user service may perform retransmission of MBMS data over a point-to-point PDP context.

MBMS QoS Distribution Tree

MBMS data will be distributed to multiple users through a MBMS distribution tree that can go through many BSCs/RNCs, many SGSNs and one or more GGSNs. Furthermore some bearer resources may be shared between many users accessing the same MBMS bearer service in order to save resources. As a result, each branch of a MBMS distribution tree is advantageously established with the same QoS. MBMS distribution tree advantageously have the same QoS for all its branches. When a branch of the MBMS distribution tree has been created, it is not suitable for another branch (e.g. due to arrival of a new UE or change of location of a UE with removal of a branch and addition of a new one) to impact the QoS of already established branches.

There is no QoS (re-)negotiation between network elements (e.g. between RNC and SGSN). This implies that some branches may not be established if QoS requirement cannot be accepted by the concerned network node.

Temporary Mobile Group Identity

Temporary Mobile Group Identity (TMGI) is used for MBMS notification purpose. The BM-SC allocates a globally unique TMGI per MBMS bearer service. The structure of the TMGI is defined in TS 23.003 (which is incorporated herein by reference).

For Multicast MBMS bearer services the TMGI is transmitted to UE via the MBMS Multicast Service Activation procedure. For Broadcast Service, the TMGI can be obtained via a service announcement.

The TMGI is a radio resource efficient MBMS bearer service identification, which is equivalent to the MBMS bearer service identification consisting of IP multicast address and APN.

IP Multicast Distribution

In GGSN it shall by configuration be possible enable distribution of MBMS payload by using IP Multicast in the backbone network. IP Multicast distribution is done from GGSN to downstream nodes (from GGSN to SGSNs or from GGSN directly to RNCs). The Source Specific Multicast (SSM) service model shall be used by nodes and routers as specified in RFC 4607 and RFC 4604. Fallback to legacy point-to-point distribution is done for nodes which do not support IP Multicast distribution.

The GGSN chooses an IP Multicast address for distribution and a Source address as well as a common TEID-U. The proposed IP Multicast and Source address for distribution and the common TEID-U is indicated by the GGSN to the downstream SGSNs at Session Start. The SGSN may accept or reject the proposed IP Multicast distribution and indicate this in the MBMS Session Start Response. If accepted, the SGSN shall report the channel (IP Multicast and Source address) to the backbone in order to join the bearer service multicast distribution and the GGSN shall send the bearer service user datagrams on the backbone using IP Multicast distribution. In case an SGSN does not accept the IP Multicast distribution, the GGSN shall fallback to unicast distribution to the SGSN in question.

The proposed IP Multicast and Source address for distribution and the common TEID-U is further indicated by the SGSN to the downstream RNC (and BSC in Iu mode) at Session Start. The RNC may accept or reject the proposed IP Multicast distribution in the MBMS Session Start Response to the SGSN. If accepted the RNC shall report the channel (IP Multicast and Source address) to the backbone in order to join the bearer service multicast distribution. If all downstream RAN nodes accepted IP Multicast distribution, and if no BSC in Gb mode exist in the downstream distribution tree, the SGSN need not to report the channel to the backbone.

The downstream node shall indicate if IP Multicast distribution is accepted in the Session Start Response. If this indication is missing, the upstream node shall treat the downstream node as not accepting IP Multicast distribution and use unicast distribution. GGSN shall assign IP Multicast addresses used for MBMS distribution according to RFC 4607. When several GGSN are used for MBMS payload distribution, the used IP Multicast addresses and common TEIDs shall be coordinated by configuration. There shall be mechanisms in the GTP-U protocol that avoids clashes between common TEIDs allocated by GGSN and TEIDs allocated by SGSN and RNC.

MBMS Session Start Procedure

The BM-SC initiates the MBMS Session Start procedure when it is ready to send data. This is a request to activate all necessary bearer resources in the network for the transfer of MBMS data and to notify interested UEs of the imminent start of the transmission. Through this procedure, MBMS session attributes such as QoS, MBMS service Area, estimated session duration, time to MBMS data transfer, are provided to the GGSN(s) and SGSN(s) that have previously registered for the corresponding MBMS bearer service and to all BSCs/RNCs that are connected to a registered SGSN. In addition the procedure allocates the bearer plane to all registered GGSNs and all registered SGSNs and to BSCs/RNCs that respond to the session start request message.

After sending the Session Start Request message the BM-SC waits for a configurable delay (time to MBMS data transfer) before sending MBMS data. This delay should be long enough to avoid buffering of MBMS data in entities other than the BM-SC, i.e. the delay should allow the network to perform all procedures required to enable MBMS data transfer before the BM-SC sends MBMS data. For example notification of UEs and radio bearer establishment should be performed before MBMS data arrive in the RAN. The delay may be in the region of multiple seconds or tens of seconds. It may be useful for the BM-SC to be able to configure different delays for MBMS bearer services on 2G and 3G, respectively.

For multicast MBMS bearer services the registration of SGSNs and GGSNs is initiated by MBMS multicast Service Activation procedures, Inter SGSN Routing Area Update procedures, Inter SGSN Serving RNS Relocation procedure and performed by MBMS Registration procedures. Also for handover purposes Inter Radio Access Technology (IRAT) PS Handover should be mentioned in relation to the registration.

For broadcast MBMS bearer services the list of downstream nodes of BM-SC and GGSN are achieved in the following ways:

The list of downstream nodes for GGSN will be sent from the BM-SC to the GGSN in the Session Start Request.

Normally, the GGSN contained in the "list of downstream nodes" for BM-SC is the default GGSN (or two for resilience).

Figure 7:
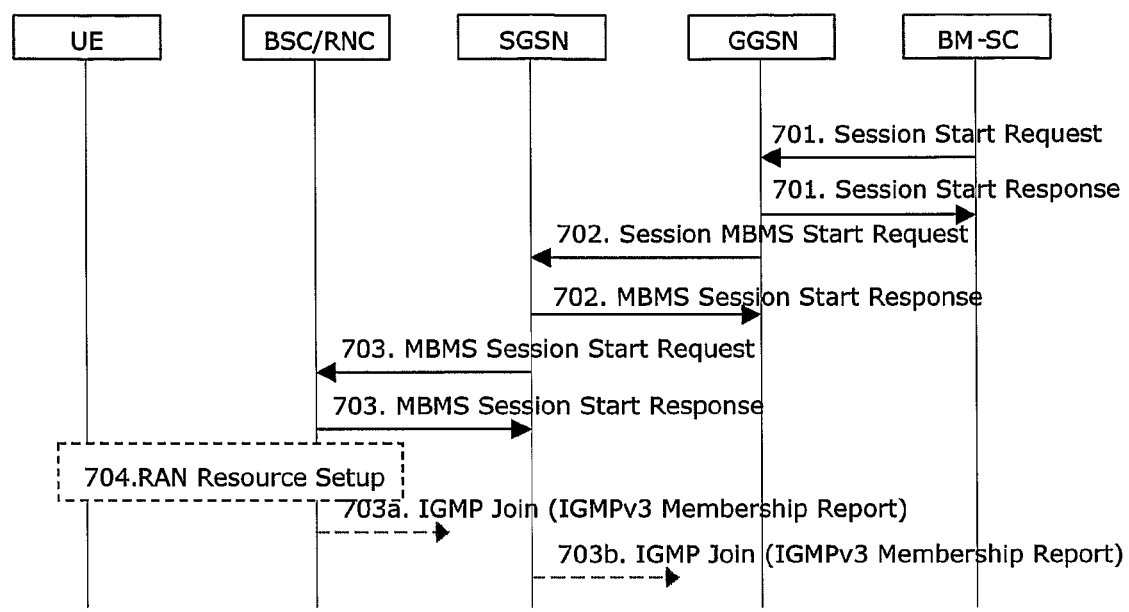
FIG. 7 illustrates schematically a session Start procedure according to the present invention.

The overall Session Start procedure is presented in FIG. 7, with the step numbers indicated:

701. The BM-SC Session and Transmission function sends a Session Start Request message to indicate the impending start of the transmission and to provide the session attributes (TMGI, QoS, MBMS service Area, Session identifier, estimated session duration, broadcast/multicast, list of downstream nodes for GGSN (Broadcast only), time to MBMS data transfer, . . . ) and the 2G/3G indicator. The message is sent to the BM-SC Proxy and Transport function, which then forwards it to the GGSNs listed in the "list of downstream nodes" parameter of the corresponding MBMS Bearer Context. The BM-SC Proxy and Transport function sets the state attribute of its MBMS Bearer Context to 'Active'. For a broadcast MBMS bearer service the GGSN creates an MBMS bearer context. The GGSN stores the session attributes and the list of downstream nodes in the MBMS Bearer Context, sets the state attribute of its MBMS Bearer Context to 'Active' and sends a Session Start Response message to the BM-SC. Proxy and Transport function which forwards it to the BM-SC Session and Transmission function. The BM-SC Proxy and Transport function copies Session Start Requests to the BM-SC Membership function for charging purposes.

702. The GGSN sends an MBMS Session Start Request message containing the session attributes (TMGI, QoS, MBMS service Area, Session identifier, estimated session duration, broadcast/multicast, time to MBMS data transfer, IP Multicast and Source addresses for backbone distribution, common TEID-U, . . . ) and the 2G/3G indicator to the SGSNs listed in the "list of downstream nodes" parameter of the corresponding MBMS Bearer Context. For a broadcast MBMS bearer service the SGSN creates an MBMS bearer context. The SGSN stores the session attributes and the 2G/3G indicator in the MBMS Bearer Context, sets the state attribute of its MBMS Bearer Context to 'Active'. If the SGSN accepts the Session start and the proposed IP Multicast and Source address for backbone distribution (and the proposed common TEID-U), the SGSN sends an MBMS Session Start Response message to GGSN including an indication that IP Multicast distribution is accepted and sets the SGSN Address for User Plane IE to the multicast address part of the "IP Multicast and Source address for backbone distribution" and sets the TEID for bearer plane, that the GGSN shall use for forwarding the MBMS data, to the "common TEID-U" received from the GGSN. If an SGSN does not accept the proposed IP Multicast and Source address for backbone distribution (or the proposed common TEID-U), the SGSN will indicate this by including an indication that IP Multicast distribution is not accepted (or leave the indication out) and include an ordinary unicast SGSN Address for user traffic and a TEID-U chosen by the SGSN in the MBMS Session Start Response message. For MBMS bearer service a SGSN receiving multiple MBMS Session Start Request messages establishes only one bearer plane with one GGSN, for instance for the first MBMS Session Start Request message.

703. The SGSN sends an MBMS Session Start Request message including the session attributes (TMGI, QoS, MBMS service Area, Session identifier, estimated session duration, broadcast/multicast, time to MBMS data transfer, list of RAs . . . ) to each BSC and/or each RNC that is connected to this SGSN. When the message is sent to an RNC/BSC in Iu mode, the IP Multicast address for backbone distribution and common TEID-U shall also be included if received from the GGSN. The 2G/3G indicator shall be used by the SGSN to determine whether the MBMS Session Start Request message is sent only to BSCs, or only to RNCs, or to both RNCs and BSCs. For a broadcast MBMS bearer service the BSC/RNC creates an MBMS Service Context. The BSC (in Iu mode) and/or RNC stores the session attributes in the MBMS Service Context, sets the state attribute of its MBMS Service Context to 'Active', and responds with an MBMS Session Start Response message. The RNC/Iu mode BSC includes the TEID in the MBMS Session Start Response message for the Iu bearer plane that the SGSN shall use for forwarding the MBMS data If the RNC accepts the Session start and the proposed IP Multicast address for backbone distribution (and the proposed common TEID-U) the RNC sends an MBMS Session Start Response message to SGSN including an indication that IP Multicast distribution is accepted. If an RNC does not accept the proposed IP Multicast address for backbone distribution (or the proposed common TEID-U), the RNC will indicate this by including an indication that IP Multicast distribution is not accepted (or leave the indication out) and include a TEID-U for the Iu bearer plane in the MBMS Session Start Response message. A BSC in Gb mode which does not serve the MBMS Service Area need not store the session attributes. A BSC/RNC receiving multiple MBMS Session Start Request messages establishes only one bearer plane with one SGSN.

703a. If the RNC accepts IP Multicast distribution the RNC joins the multicast group in the IP backbone. It will join with the procedures setup in RFC 3376, RFC 3810, and RFC 4604.

703b. If at least one RNC did not accept IP Multicast distribution or if there are BSCs in Gb mode, the SGSN joins the multicast group in the IP backbone. It will join with the procedures setup in RFC 3376, RFC 3810, and RFC 4604.

704. The BSC/RNC establish the necessary radio resources for the transfer of MBMS data to the interested UEs. RAN resource set up can be scheduled according to the time to MBMS data transfer parameter.

It should be noted that the upstream node normally provides the MBMS Session Start Request message once per MBMS session to a downstream node. Due to "Intra Domain Connection of RAN Nodes to Multiple Core Network Nodes" however, a BSC/RNC may receive the MBMS Session Start Request message from several SGSNs.

MBMS Session Stop Procedure

The BM-SC Session and Transmission function initiates the MBMS Session Stop procedure when it considers the MBMS session to be terminated. The session is typically terminated when there is no more MBMS data expected to be transmitted for a sufficiently long period of time to justify a release of bearer plane resources in the network. The procedure is propagated to all SGSNs and GGSNs that are registered for the corresponding MBMS bearer service and to BSCs/RNCs that have an established Iu bearer plane with an SGSN.

Figure 8:
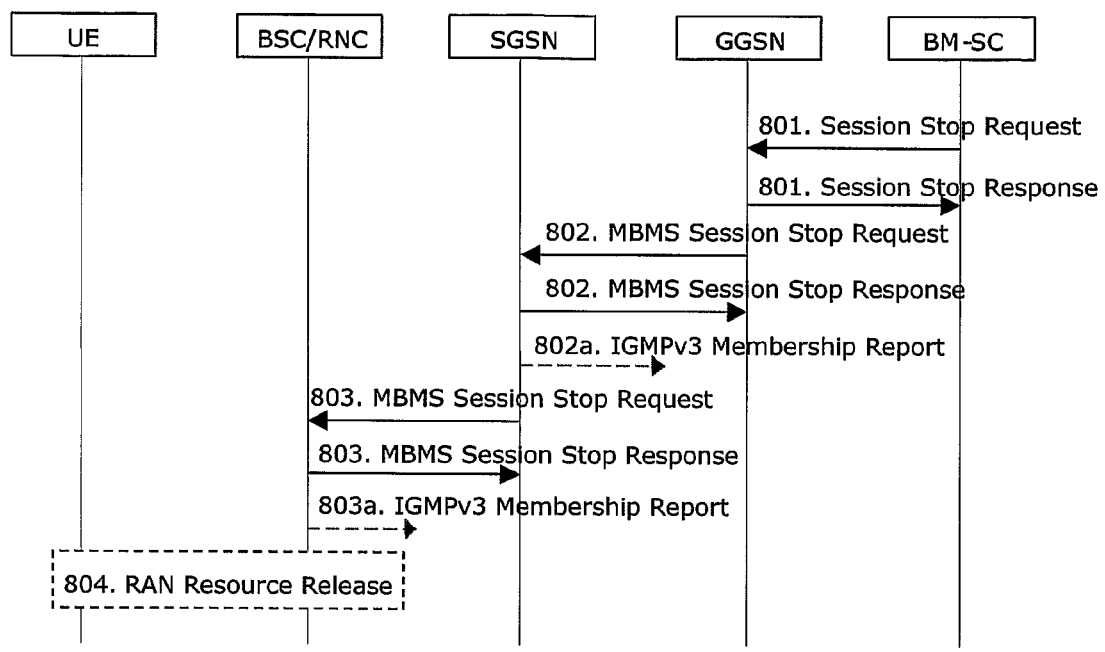
FIG. 8 illustrates schematically an MBMS Session Stop procedure according to the present invention.

The overall MBMS Session Stop procedure is presented in FIG. 8:

801. The BM-SC Session and Transmission function sends a Session Stop Request message to the BM-SC Proxy and Transport function, which forwards it to all GGSNs listed in the "list of downstream nodes" parameter of the affected MBMS Bearer Context to indicate that the MBMS session is terminated and the bearer plane resources can be released. The BM-SC Proxy and Transport function sets the state attribute of its MBMS Bearer Context to 'Standby'. The GGSN sends a Session Stop Response message to the BM-SC Proxy and Transport function, which forwards it to the BM-SC Session and Transmission function. The BM-SC Proxy and Transport function copies Session Stop Requests to the BM-SC Membership function for charging purposes.

802. The GGSN sends an MBMS Session Stop Request message to all SGSNs that have a bearer plane established with the GGSN, releases the corresponding bearer plane resources towards these SGSNs and sets the state attribute of its MBMS Bearer Context to 'Standby'. The GGSN releases the MBMS Bearer Context in case of a broadcast MBMS bearer service.

802a. If the SGSN is using IP multicast distribution it shall disable reception from the IP backbone of the particular MBMS bearer service. It will use the procedures setup in RFC 3376, RFC 3810, and RFC 4604.

803. The SGSN releases the TEID and bearer plane resources on which it was receiving MBMS data from the GGSN for the affected MBMS bearer service and sends an MBMS Session Stop Request message to all BSCs/RNCs that have a bearer plane established with the SGSN. The SGSN releases the MBMS Bearer Context in case of a broadcast MBMS bearer service.

803a If the RNC/BSC is using IP multicast distribution it shall disable reception from the IP backbone of the particular MBMS bearer service. It will use the procedures setup in RFC 3376, RFC 3810, and RFC 4604.

804. The RNC releases the affected radio and Iu resources; the BSC releases the affected radio resources. The BSC/RNC releases the MBMS Service Context in case of a broadcast MBMS bearer service. A BSC in Gb mode shall send an acknowledgement to the SGSN even if there is no active MBMS context in the BSC.

MBMS De-Registration Procedure
Common MBMS De-Registration Procedure

The MBMS De-Registration is the procedure by which a downstream node informs an upstream node that it does not need to receive signalling, session attributes and data for a particular MBMS bearer service anymore and therefore would like to be removed from the corresponding distribution tree.

The MBMS De-registration procedure is initiated:

By the SGSN or GGSN when the last MBMS UE Context for a particular MBMS bearer service is deleted from the node and the "list of downstream nodes" parameter in the corresponding MBMS Bearer Context is empty;

By the SGSN or GGSN when the last node registered in the "list of downstream nodes" de-registers from an MBMS bearer service for which there is no corresponding MBMS UE Context; or By the DRNC (De-registering RNC) that registered at an SGSN when it deletes the associated MBMS Service Context.

Figure 9:
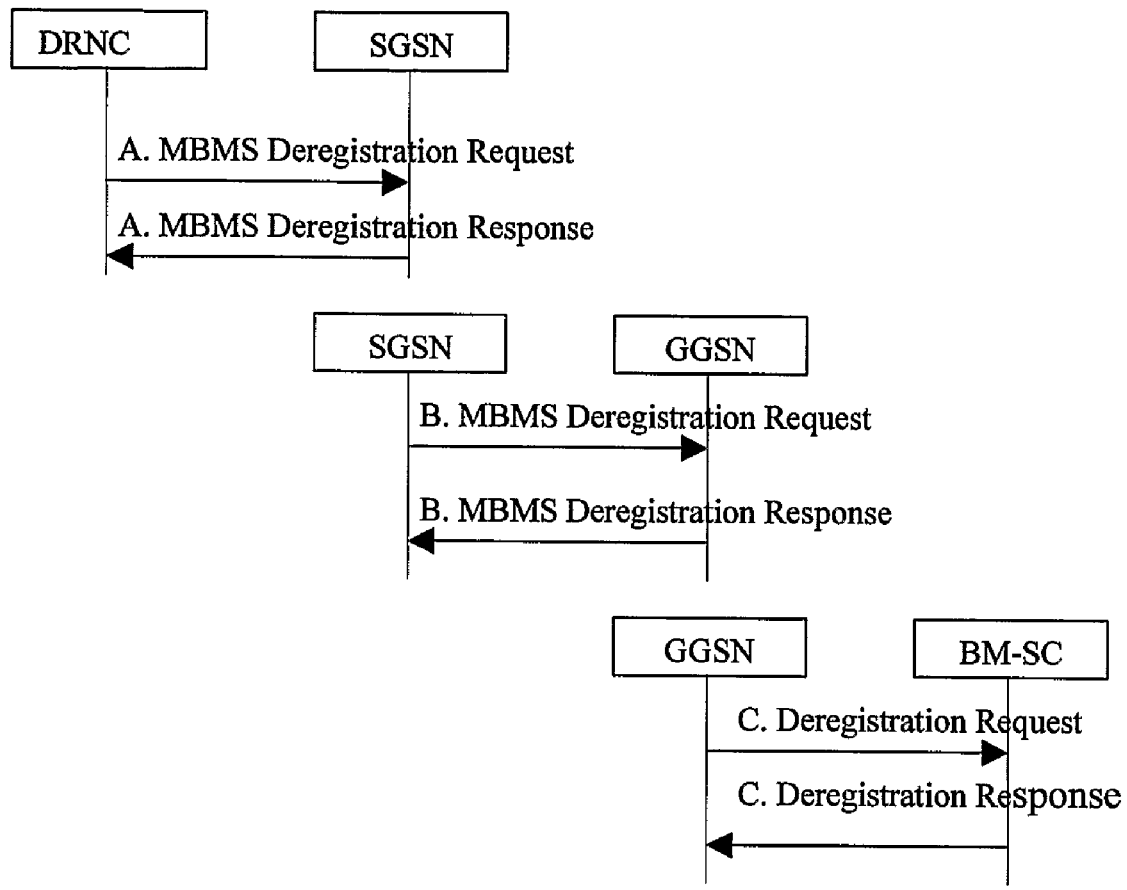
FIG. 9 illustrates schematically an MBMS De-Registration Procedure according to the present invention.

The de registration procedure is shown in FIG. 9:

A. When the DRNC that is registered at an SGSN no longer hosts any UE interested in that MBMS bearer service, the DRNC requests the de-registration from the MBMS bearer service to its parent SGSN. As an implementation option, the DRNC may decide not to de-register from the MBMS bearer service immediately when these conditions are met, e.g. in order to avoid unnecessary signalling in the case where the RNC would again need the same MBMS bearer service shortly after. Also the SGSN and/or GGSN may decide to not de-register immediately in order to avoid unnecessary signalling, i.e. wait a certain time period before de-registering the DRNC.

The SGSN removes the identifier of the RNC from the "list of downstream nodes" parameter of the affected MBMS Bearer Context and confirms the operation by sending an MBMS De-Registration Response message to the RNC. If an Iu bearer plane had been established between the DRNC and the SGSN for this MBMS bearer service, the Iu bearer plane is released. If the RNC is using IP multicast distribution it shall disable reception from the IP backbone of the particular MBMS bearer service. It will use the procedures described in RFC 3376, RFC 3810, and RFC 4604.

B. When the "list of downstream nodes" of a particular MBMS Bearer Context in the SGSN becomes empty and the SGSN has no MBMS UE Contexts linked to that MBMS Bearer Context, the SGSN sends an MBMS De-Registration Request (IP multicast address, APN) message to its upstream GGSN associated with the MBMS Bearer Context.

The GGSN removes the identifier of the SGSN from the "list of downstream nodes" parameter of the affected MBMS Bearer Context and confirms the operation by sending an MBMS De-Registration Response message to the SGSN. If a bearer plane had been established between the SGSN and the GGSN for this MBMS bearer service, the bearer plane is released. If the SGSN is using IP multicast distribution it shall disable reception from the IP backbone of the particular MBMS bearer service. It will use the procedures described in RFC 3376, RFC 3810, and RFC 4604.

C. When the "list of downstream nodes" of a particular MBMS Bearer Context in the GGSN becomes empty and the GGSN has no MBMS UE Contexts linked to that MBMS Bearer Context, the GGSN sends a De-Registration Request (IP multicast address, APN) message to the BM-SC. Proxy and Transport function If a bearer plane had been established over Gi for this MBMS bearer service, the bearer plane is released.

The BM-SC removes the identifier of the GGSN from the "list of downstream nodes" parameter of the affected MBMS Bearer Context and confirms the operation by sending a De-Registration Response message to the GGSN.

BM-SC Initiated MBMS De-Registration Procedure

Figure 10:
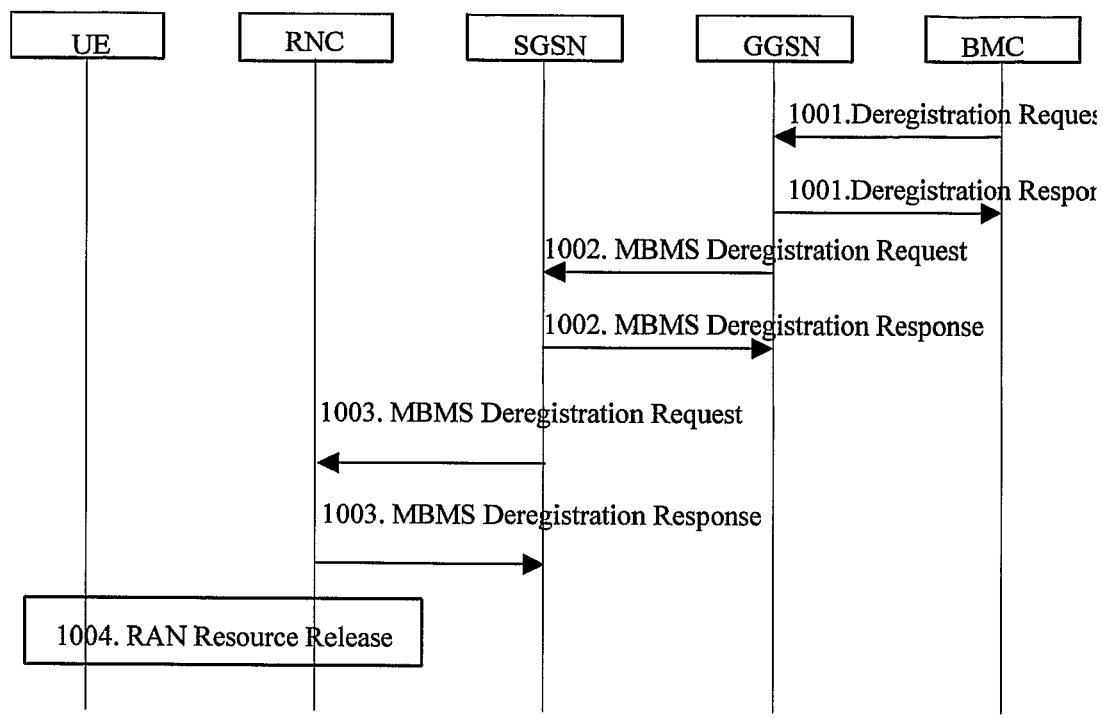
FIG. 10 illustrates schematically a BM-SC initiated MBMS De-Registration Procedure according to the present invention.

This MBMS De-Registration Procedure is initiated by BM-SC when the specific MBMS bearer service is terminated. This procedure tears down the distribution tree for the delivery of session attributes and MBMS data. This procedure results in releasing of all MBMS Bearer Contexts and associated MBMS UE Contexts in the nodes along the distribution tree. This procedure is shown in FIG. 10:

1001. The BM-SC sends a De-Registration Request message to all GGSNs contained in the "list of downstream nodes" parameter of the corresponding MBMS Bearer Context to indicate the session is terminated and any related MBMS bearer resources shall be released.

The GGSN returns a De-Registration Response message to the BM-SC. The BM-SC releases all MBMS UE Contexts and the corresponding MBMS Bearer context.

1002. The GGSN sends an MBMS De-Registration Request message to all SGSNs contained in the "list of downstream nodes" parameter of the corresponding MBMS Bearer Context. The SGSN returns an MBMS De-registration Response message to the GGSN, and releases all bearer resources if the state attribute of the MBMS Bearer Context is 'Active'. If the SGSN is using IP multicast distribution it shall disable reception from the IP backbone of the particular MBMS bearer service. It will use the procedures described in RFC 3376, RFC 3810, and RFC 4604. The GGSN releases all MBMS UE Contexts and the affected MBMS Bearer Context. If a bearer plane had been established over Gi for this MBMS bearer service, the bearer plane is released.

1003. The SGSN sends an MBMS De-Registration Request message to all RNCs connected with this SGSN. The RNC returns an MBMS De-Registration Response message to the SGSN, and releases all bearer resources if the state attribute of the MBMS Service Context is 'Active'. If the RNC is using IP multicast distribution it shall disable reception from the IP backbone of the particular MBMS bearer service. It will use the procedures described in RFC 3376, RFC 3810, and RFC 4604. The SGSN releases all MBMS UE Contexts and the affected MBMS Bearer Context. If a bearer plane had been established between the SGSN and the GGSN for this MBMS bearer service, the bearer plane is released.

1004. The RNC releases the affected radio resources, all MBMS UE Contexts and the MBMS Service Context. The detailed procedures are specified in TS 25.346 and TS 43.246. RAN may notify the UEs that the MBMS Bearer service has being terminated, so that the UE can locally deactivate its MBMS UE context, detailed procedures are specified in TS 25.346 and TS 43.246.

Even though the present invention has been described with reference to a 2.5 and 3G network solution (e.g. GPRS and UMTS) it may also be applied to other networks operating in a similar manner for instance future solutions of wireless communication depending on how the architecture is set up in these cases. The solution makes use of separation between the control plane and the user plane by setting up the tunnels using the control plane but sending the actual payload data on the user plane backbone network. It should be noted that the solution according to the present invention may also find applicability in a 2G solution with the difference that the SGSN will act as host instead of the RNC and the SGSN will transmit payload information to a BSC for further transport to each mobile station (MS). It is possible with some amendments of the BSC that the BSC may also act as a host in a similar manner as the RNC.

It should be noted that the word "comprising" does not exclude the presence of other elements or steps than those listed and the words "a" or "an" preceding an element do not exclude the presence of a plurality of such elements. The invention can at least in part be implemented in either software or hardware. It should further be noted that any reference signs do not limit the scope of the claims, and that several "means", "devices", and "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

ABBREVIATIONS

BM-SC Broadcast/Multicast Service Center
GGSN Gateway GPRS Service Node
GPRS General Packet Radio Service
GTP GPRS Tunneling Protocol
GRX GPRS Roaming eXchange
IE Information Element
IGMP Internet Group Management Protocol
IP Internet Protocol
ISRAU Inter SGSN RAU
MBMS Multimedia Broadcast/Multicast Service
MLD Multicast Listener Discovery
MS Mobile Station (mobile phone in a GPRS network)
OTS One Tunnel Solution
PDN Packet Data Network
PDP Packet Data Protocol
PLMN Public Land Mobile Network
RAU Routing Area Update
RNC Radio Network Controller
SGSN Serving GPRS Service Node TEID Tunnel Endpoint Identifier
TEID-C TEID identifying a Control plane tunnel
TEID-U TEID identifying a User plane tunnel
UE User Equipment (=MS)
UMTS Universal Mobile Telecommunications System
UTRAN/GERAN Universal Terrestrial Radio Access Network/GSM-EDGE Radio Access Network

The invention claimed is:

1. A method for facilitating distribution of multimedia broadcast multicast services (MBMS) in a telecommunications network, comprising the steps of:
 receiving an MBSM session start message from a broadcast/multicast service center;
 sending control traffic on a control network;
 sending as control traffic to a serving node an MBMS session start request message and including a common tunnel end-point identifier (cTEID) in the MBMS session start request message;
 receiving information from the serving node indicating the acceptance of using IP multicast; and
 sending media content on an IP multicast backbone to hosts that have joined the multicast group using the cTEID.

2. The method according to claim 1, further comprising the step of synchronizing the cTEID with other infrastructure devices in order to ensure the uniqueness of the cTEID.

3. The method according to claim 1, further comprising the step of receiving a unique cTEID from another infrastructure device.

4. The method according to claim 1, further comprising the step of creating at least one network communication tunnel to at least one of a serving and a control node for fallback purposes.

5. A telecommunication infrastructure network for facilitating distribution of multimedia broadcast multicast services (MBMS), comprising:
 a broadcast/multicast service node (BM-SC);
 a gateway node;
 at least one serving node; and
 at least one control node;
wherein the BM-SC is connected to the gateway node which in turn is connected to the serving node via two interfaces, a control interface and a backbone interface, the control node is in turn connected to the serving node and/or the gateway node, the gateway node is configured for:
 receiving an MBSM session start message from the broadcast/multicast service center;
 sending control traffic on the control interface;
 sending as control traffic to the serving node an MBMS session start request message and including a common tunnel end-point identifier (cTEID) in the MBMS session start request message;
 receiving information from the serving node indicating the acceptance of using IP multicast; and
 sending media content on an IP multicast backbone to hosts that have joined the multicast group using the cTEID.

6. A method for facilitating distribution of multimedia broadcast multicast services (MBMS) in a telecommunication network, comprising the steps of:
 receiving in a gateway node an MBSM session start message from a broadcast/multicast service center (BM-SC);
 sending control traffic on a control network;
 sending as control traffic from the gateway node to a serving node an MBMS session start request message and including a common tunnel end-point identifier (common TEID) in the MBMS session start request message;
 receiving information from the serving node indicating the acceptance of using IP multicast; and
 sending media content on an IP multicast backbone to hosts that have joined the multicast group using the common TEID.

7. The method according to claim 6, wherein the common TEID is unique for each MBMS session.

8. The method according to claim 6, wherein the host is at least one of a serving node and a control node.

9. The method according to claim 6, wherein the common TEID is identified by setting at least one bit of a TEID structure to indicate an active state.

10. The method according to claim 6, further comprising the step of using a fallback procedure comprising setting up GTP tunnels between the gateway and the serving nodes and between the serving nodes and the control nodes.

11. The method according to claim 6, further comprising the step of joining of the control device to the IP multicast backbone comprises sending a message indicative of the interest to join to the IP multicast backbone.

* * * * *

UNITED STATES PATENT AND TRADEMARK OFFICE
CERTIFICATE OF CORRECTION

PATENT NO. : 7,957,376 B2
APPLICATION NO. : 12/445106
DATED : June 7, 2011
INVENTOR(S) : Eriksson et al.

It is certified that error appears in the above-identified patent and that said Letters Patent is hereby corrected as shown below:

On the Title Page, in Field (75), under "Inventors", in Column 1, Line 3, delete "Ronneke," and insert -- Rönneke, --, therefor.

On the Title Page, in Field (75), under "Inventors", in Column 1, Line 4, delete "Frolunda" and insert -- Frölunda --, therefor.

On the Title Page, in Field (57), under "ABSTRACT", in Column 2, Line 4, delete "MBSM" and insert -- MBMS --, therefor.

In Fig. 10, Sheet 10 of 10, below "BMC", in Line 1, delete "Reque" and insert -- Request --, therefor.

In Fig. 10, Sheet 10 of 10, below "BMC", in Line 2, delete "Respor" and insert -- Response --, therefor.

In Column 4, Line 43, delete "MBSM" and insert -- MBMS --, therefor.

In Column 4, Line 54, delete "cTEID;" and insert -- cTEID. --, therefor.

In Column 5, Line 1, delete "MBSM" and insert -- MBMS --, therefor.

In Column 5, Line 56, delete "MBSM" and insert -- MBMS --, therefor.

In Column 5, Line 67, delete "cTEID;" and insert -- cTEID. --, therefor.

In Column 6, Line 5, delete "MBSM" and insert -- MBMS --, therefor.

In Column 6, Line 19, delete "TEID;" and insert -- TEID. --, therefor.

Signed and Sealed this
Twentieth Day of December, 2011

David J. Kappos
*Director of the United States Patent and Trademark Office*

CERTIFICATE OF CORRECTION (continued)
U.S. Pat. No. 7,957,376 B2

In Column 6, Line 26, delete "node;" and insert -- node. --, therefor.

In Column 7, Line 2, delete "invention." and insert -- invention; --, therefor.

In Column 7, Line 13, delete "invention;" and insert -- invention. --, therefor.

In Column 9, Line 54, delete "distribution"" and insert -- distribution". --, therefor.

In Column 11, Lines 28-29, delete "TEID-Upper" and insert -- TEID-U per --, therefor.

In Column 11, Line 31, delete "TEID-Upper" and insert -- TEID-U per --, therefor.

In Column 12, Line 41, delete "GGSNs)" and insert -- GGSNs); --, therefor.

In Column 12, Line 43, delete "TEID-Us)" and insert -- TEID-Us); and --, therefor.

In Column 12, Line 45, delete "synchronization" and insert -- synchronization. --, therefor.

In Column 21, Line 23, after "MBMS", delete "to".

In Column 23, Line 12, in Claim 1, delete "MBSM" and insert -- MBMS --, therefor.

In Column 24, Line 1, in Claim 5, delete "MBSM" and insert -- MBMS --, therefor.

In Column 24, Line 16, in Claim 6, delete "MBSM" and insert -- MBMS --, therefor.